United States Patent [19]
Rostagno

[11] 3,835,226
[45] Sept. 10, 1974

[54] PRODUCTION OF EDIBLE GRANULES
[76] Inventor: Walter Rostagno, Corseaux, Switzerland
[22] Filed: Nov. 26, 1971
[21] Appl. No.: 202,485

[30] Foreign Application Priority Data
Dec. 4, 1970  Switzerland.................. 17951/70

[52] U.S. Cl.................. 426/213, 426/214, 426/215
[51] Int. Cl............................................. A23g 3/00
[58] Field of Search ......... 99/134 R, 26, 71, 56, 93; 426/213, 214, 215

[56] References Cited
UNITED STATES PATENTS
| | | | |
|---|---|---|---|
| 1,155,977 | 10/1915 | Vernon | 99/DIG. 4 |
| 1,656,572 | 1/1928 | Shultze | 99/DIG. 4 |
| 2,726,959 | 12/1955 | Lushbought | 99/134 R |
| 3,135,612 | 6/1964 | Hair | 99/DIG. 4 |

Primary Examiner—A. Louis Monacell
Assistant Examiner—J. M. Hunter
Attorney, Agent, or Firm—Watson Leavenworth Kelton & Taggart

[57] ABSTRACT

Expanded, edible granules are prepared by depositing drops of a syrup containing a sugar and at least one expanding agent on a bed of powered edible material and heating the drops, whilst in contact with the bed, to produce expansion and drying. The granules may for example be incorporated in chocolate or confectionery articles.

10 Claims, 3 Drawing Figures

PRODUCTION OF EDIBLE GRANULES

The present invention is concerned with the preparation of edible granules of low density, useful, in particular, in the chocolate and confectionery industries.

It is an object of the present invention to provide a process for preparing expanded sugar-based granules which are especially suited for incorporation in various chocolate and confectionery articles.

The present invention provides a process for producing expanded granules in which drops of a syrup containing a sugar and at least one expanding agent are deposited on a bed of powdered edible material and the drops are heated to produce expansion and drying of the drops whilst they are in contact with the said edible material.

By the expression "syrup" is meant a solution of sugar in water optionally containing, in solution or in suspension, other ingredients such as flavouring, colouring agents and the like. An expanding agent is a substance, or mixture of substances, capable of provoking the expansion of the syrup on heating, generally by liberation of a gas, in a manner similar to baking powder. Any residue remaining from the expanding agent should, of course, be comestible.

In one embodiment of the process according to the invention, drops of a syrup containing an expanding agent, ammonium bicarbonate for example, are deposited on a flat horizontal support which has been coated with a layer of edible powdered material. The edible powdered material provides a deformable recipient closely conforming to the shape of the drops at the moment of impact and at the same time facilitates their drying by absorption. The drops of syrup resting on this bed of powder are then heated to a temperature of between 140° and 160°C for 3 to 4 minutes. The granules obtained after cooking are hollow dry capsules or particles of dry expanded material, of essentially spherical shape, and their volume is about five times that of the original drops. These granules are then separated from their powdered support, for example by screening.

In a second embodiment of the process, a coating of edible powdered material is deposited on the drops before cooking. The whole surface of each drop is thus in contact with the powder, a part of which constitutes a surface film surrounding each of the granules after cooking.

The edible powdered material will generally be chosen having regard to the desired characteristics of the expanded granules and various powdered materials may be selected to confer a particular colour, flavour and/or texture to the finished granules. Preferred edible materials include, for example, starch and its hydrolysis products, cocoa, powdered coffee extract, milk powder, cereal flours, etc.

The influence of the powdered edible material on the chemical composition of the expanded granules is illustrated in the Examples. Thus, although the syrups used in these examples contain no starch, the granules obtained by cooking the drops of syrup in contact with a bed of powdered starch have a starch content which varies between 13.5 and 48.4 percent by weight. These amounts of starch are related to the chemical composition of the syrup used, its solid matter content, the quality of the starch, as well as to the manner in which the drops are coated.

On the other hand, the starch in contact with the surface of the drop is capable of forming, by gelatinisation during cooking, an elastic film imparting a regular substantially spherical shape to the expanding granule.

In the same way, agreeably flavoured granules may be obtained by using, for example, coffee extract or cocoa powder as a support.

The density of the granules may be varied by modifying the quantity of expanding agent added to the syrup; the size of the granules can also be adjusted by using different jets for depositing the drops of syrup, as well as by varying the temperature and the cooking time.

The accompanying drawing illustrates schematically and by way of example an apparatus suitable for carrying out continuously the process according to the invention.

Figure 1:
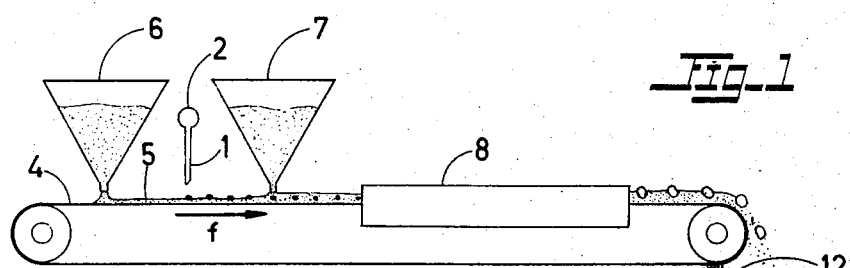
FIG. 1 is a schematic representation of the complete apparatus.
Figure 2:
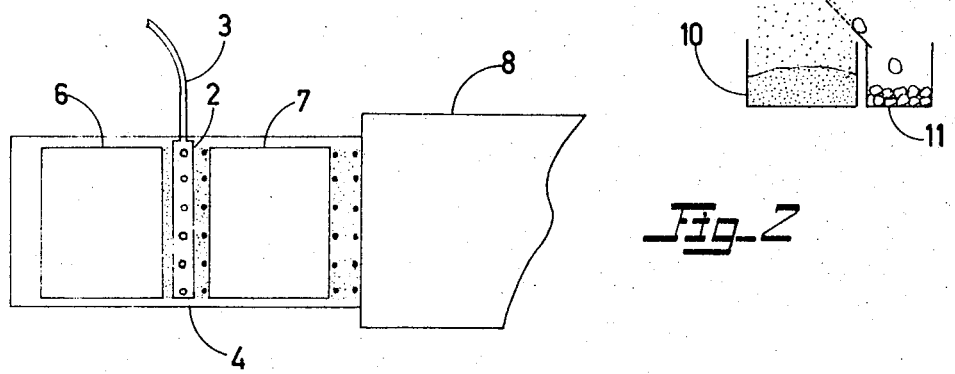
FIG. 2 is a plan view from above of a part of the apparatus shown in FIG. 1.
Figure 3:
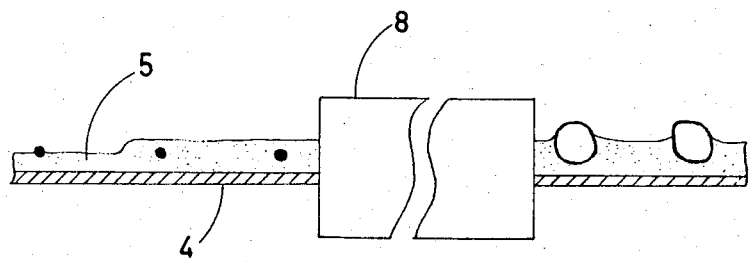
FIG. 3 is an axial section on an enlarged scale of a part of the bed of powdered material.

As shown in the drawing, the apparatus comprises a series of vertical jets 1 extending from horizontal tube 2. This tube is supplied with syrup by a pipe 3 fed for example by a pump (not shown). The jets 1 deposit drops of syrup on a horizontal belt conveyor 4 moving in the direction of the arrow f. The belt 4 is coated ahead of the jets 1 with a layer 5 of edible powdered material supplied from the hopper 6. The drops of syrup deposited on the layer 5 of edible powdered material are then covered with a second layer of powdered material (which may be the same as, or different from, the material supplied from hopper 6) flowing from the hopper 7 which is situated downstream from the jets 1. The drops then pass into an oven 8 the heating zone of which is traversed by a part of the belt conveyor 4.

At the end of the run, the powdered bed and the expanded granules leave the oven 8 and are discharged by gravity onto an inclined vibrating screen 9. The powdered material passes through the screen 9 and is collected in the receptacle 10 whereas the granules, which remain on the screen, roll into the receptacle 11.

The edible powder may be recycled whereas the granules are cooled to ambient temperature and are preferably stored in a dry atmosphere.

The granules prepared as described herein may advantageously be incorporated in various chocolate and confectionery products, if desired as a replacement, or together with, puffed cereal products obtained from rice or maize. Articles containing the granules have a pleasant, light texture and pleasant flavour.

The following examples illustrate the process according to the invention. The percentages are by weight.

EXAMPLE 1

A syrup of the following composition is prepared:-

| | |
|---|---|
| Sucrose | 51.25 % |
| Ammonium bicarbonate | 0.50 |
| Citric acid | 0.25 |
| Colouring | 0.50 |
| Strawberry flavour | 2.50 |
| Water | 45.00 |

This syrup is deposited in the form of drops on a belt conveyor previously coated with a layer of powdered starch. The deposited drops are then covered with a second layer of powdered starch and carried by the belt into a tunnel oven in which the temperature is between 144° and 152°C. The drops are maintained at this temperature for 3½ minutes. The resulting dry expanded granules have a specific gravity of 0.200 and a starch content of 48.4 percent.

EXAMPLE 2

Drops of a syrup having the following composition are treated as in Example 1:-

| | |
|---|---|
| Sucrose | 51.45 % |
| Ammonium bicarbonate | 0.60 |
| Citric acid | 0.25 |
| Colouring | 0.50 |
| Pistachio flavour | 2.00 |
| Vanillin | 0.20 |
| Water | 45.00 |

The dry expanded granules collected after cooling have a specific gravity of 0.185 and a starch content of 45 percent.

EXAMPLE 3

A syrup of the following composition is used:-

| | |
|---|---|
| Sucrose | 61.25 % |
| Ammonium bicarbonate | 0.50 |
| Citric acid | 0.25 |
| Colouring | 0.50 |
| Lemon flavour | 2.50 |
| Water | 35.00 |

Drops of this syrup, treated by the process described in Example 1, give, after expansion and drying, granules having a specific gravity and starch content of, respectively, 0.240 and 29.80 percent.

EXAMPLE 4

A syrup having the following composition is prepared:

| | |
|---|---|
| Sucrose | 20.00 % |
| Ammonium bicarbonate | 1.00 |
| Unsweetened condensed milk | 18.60 |
| Powdered malt | 19.00 |
| Water | 41.40 |

Drops of this syrup are deposited on a belt conveyor previously coated with a layer of powdered starch and heated to between 144° and 152°C for 3½ minutes by passage through a tunnel oven. The dry expanded granules collected at the exit of the tunnel have a specific gravity of 0.127 and a starch content of 13.5 percent.

I claim:
1. A process for preparing expanded, edible, sugar-based granules comprising depositing drops of a syrup comprising water, sugar and at least one expanding agent on a bed of powdered edible material and heating said drops to a temperature sufficient to provoke evolution of gas from said expanding agent, thereby to expand, and to dry, said drops while they are in contact with said edible material.
2. A process according to claim 1 in which the syrup additionally contains at least one substance selected from the group consisting of a flavoring agent, a colouring agent, milk solids and malt.
3. A process according to claim 1 comprising depositing a layer of edible powdered material on the drops, prior to heating said drops.
4. A process according to claim 1 in which the edible material is selected from the group consisting of carbohydrate, starch, cereal flour, cocoa powder, powdered coffee extract and milk powder.
5. A process according to claim 3 in which the edible material is selected from the group consisting of carbohydrate, starch, cereal flour, cocoa powder, powdered coffee extract and milk powder.
6. Process according to claim 1, in which the expanding agent is ammonium bicarbonate and the drops are heated to a temperature between 140° and 160°C.
7. Process for preparing expanded, edible, sugar-based granules comprising forming drops of a syrup comprising water sugar and at least one expanding agent, covering essentially the whole surfaces of said drops with a powder of edible material, and heating said covered drops to a temperature sufficient to provoke evolution of a gas from said expanding agent and to dry said covered drops into hollow, essentially spherical capsules.
8. Expanded granules obtained by the process according to claim 7.
9. A chocolate or confectionery article consisting essentially of a chocolate or confectionery mass and expanded granules obtained by the process according to claim 7.
10. Granules according to claim 8 in which the edible material is selected from the group consisting of carbohydrate, starch, cereal flour, cocoa powder, powdered coffee extract and milk powder.

* * * * *